July 15, 1941.  L. M. POTTS  2,249,435

MOTOR CONTROL AND PHASING

Original Filed July 3, 1937    2 Sheets-Sheet 2

Inventor
LOUIS M. POTTS

BY
*H. B. Whitfield*
Attorney

Patented July 15, 1941

2,249,435

UNITED STATES PATENT OFFICE 2,249,435

MOTOR CONTROL AND PHASING

Louis M. Potts, Evanston, Ill., assignor to Teletype Corporation, Chicago, Ill., a corporation of Delaware Original application July 3, 1937, Serial No. 151,827. Divided and this application March 17, 1939, Serial No. 262,345

38 Claims. (Cl. 178—69.5)

The present invention pertains to telegraphic communication systems and more particularly to telegraph systems involving a plurality of substations arranged upon a plurality of radial lines which connect a central office with the substations which are provided with telegraph apparatus having a driving motor normally inert.

An object of this invention is to maintain synchronism of a substation driving motor by the use of alternating currents transmitted from a central office over a communication line but independently of communication signals transmitted over the line.

A feature of the invention is the provision of means associated with the switching devices at the central office and with the motors of the substations such that a substation motor is started into operation in response to seizure of its connecting line by the central office switching equipment and in which synchronous motors may be started by an alternating current of low frequency which is increased to the full operating frequency of the motor, the motor being thereafter maintained in synchronism by a continuous alternating current supplied over a power circuit or synchronizing circuit which is operatively independent of communication signals.

Further features reside in provision of means for restarting substation motors automatically, should they have been stopped, in the provision of auxiliary means for supplying power to the substation motor, and in the provision of starting means changeable dependently upon increasing speed of the motor to synchronizing speed.

These objects and features are attained by supplying at the central office embodied in interconnective devices a source of alternating current which supplies the synchronizing power over a power conductor or over the communication conductor or over phantom or composited circuits after a communication condition has been established and over various circuits in the steps of progress toward establishment of the communication condition, and by providing further means in the connective equipment at the central office for supplying an alternating current of varied frequency, this further means also being operative to supply to a line a polyphase current comprising a series of impulses of alternating polarities and of increasing frequency in response to seizure of the line for communication purposes.

This application is a division of U. S. Patent No. 2,237,951, issued April 8, 1941 to L. M. Potts.

A more complete understanding of the invention will be obtained from the following description taken in connection with the accompanying drawings, in which.

Figures 1, 4, 5:
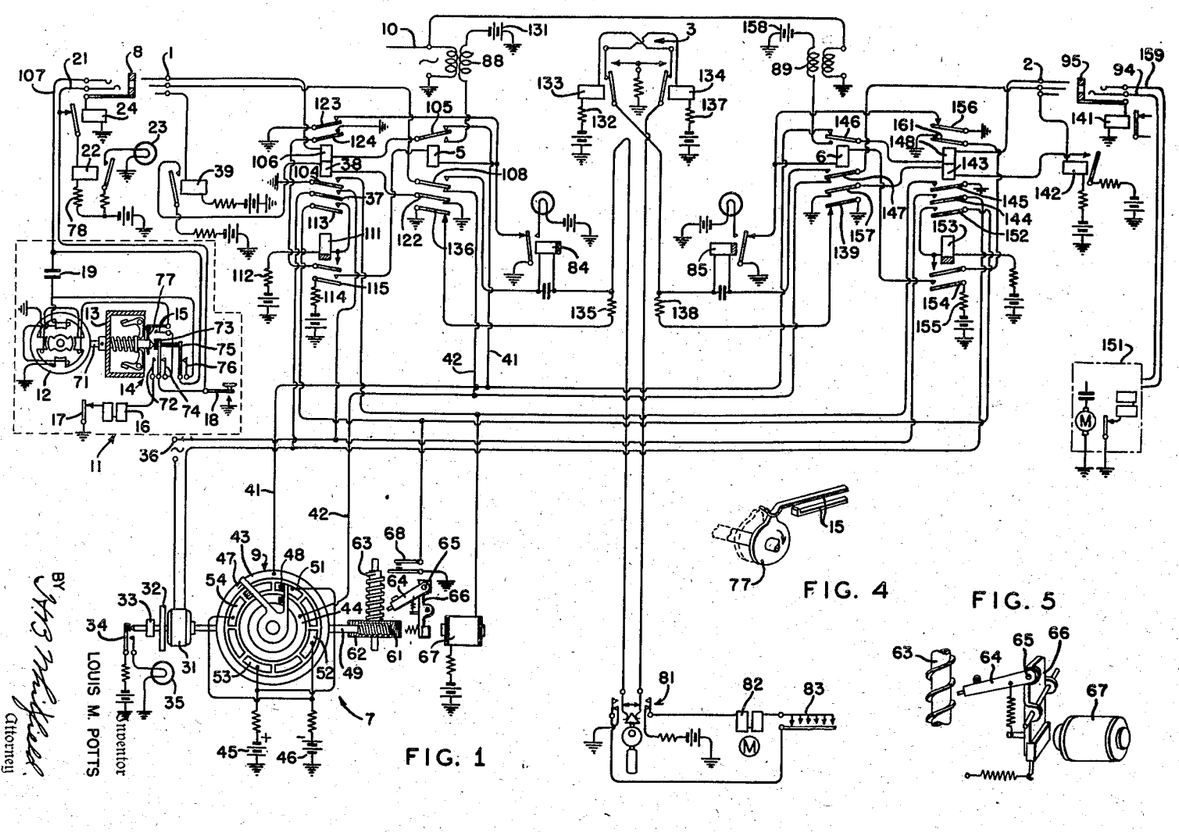
Fig. 1 illustrates a complete equipment of one central office connective unit associated with two line jacks and one substation.
Fig. 4 illustrates cam 77 of Fig. 1.
Fig. 5 illustrates pivoted armature lever 66 of Fig. 1.

In Fig. 1, a connective pair of plugs 1 and 2 are connected for communication through a repeater relay set 3 when relays 5 and 6 are energized, and the circuits of the connective plugs also include inductive association with a source of alternating current when connective relays 5 and 6 are energized. Prior to energization of relays 5 and 6 respectively, the switching plugs 1 and 2 are connected to output conductors of a generator 7 which normally is at rest, but which is energized to start into rotation when plug 1 or plug 2 is inserted into a line jack such as 8. The generator 7 then delivers to line conductors associated with the line jack and plug, a polyphase current comprising two concurrent series of alternating current impulses generated by its commutator 9, the frequency of which increases as the speed of the generator 7 increases, until this increasing frequency attains the frequency of the alternating current source 10 after which relay 5 is operated to switch the conductors of plug 1 through to the alternating current source 10 and to the repeating relay set 3.

At substation 11, a synchronous motor 12 is provided with a centrifugal device 13 having a switch 14 with a plurality of contacts which are shown in contactual relations of their condition of rest. The centrifugal device has also a cam contact 15 which is operated by a rotating cam 77 effective at low speeds of motor 12 as shown in solid line in Fig. 4, but withdrawn as shown in dotted line, by the centrifugal device 13 when motor 12 is rotated at higher speeds. A printer selector magnet is symbolized at 16, a permutation code signal transmitter is symbolized at 17, a calling key is illustrated at 18, and a condenser 19 is included in an alternating current power circuit of motor 12 to prevent operation of series relay winding 100.

At the central office, the radial substation communication line 21 is provided with a switching jack 8 and a signaling line relay 22 which has a line lamp 23 and a cut-off relay 24. Specific circuits for the described apparatus will be identified and traced in the description of operation of the system.

Generator 7 comprises a self-starting alternating current motor 31 having flywheel 32 to retard acceleration and centrifugal device 33 similar to device 13 which controls a centrifugal switch 34 to energize a signal lamp 35. Motor 31 is supplied with power from a source 36 under control of an armature 37 of relay 38 energized by control of sleeve relay 39 which is responsive over an obvious circuit to insertion of plug 1 into jack 8.

Variable generator 7 has output conductors 41 and 42 connected respectively to outer ring 43 and inner ring 44 of the commutator 9. Positive battery 45 and negative battery 46 supply current to the commutator 9 which by insulated brushes 47 and 48, carried by arms on motor shaft 49, connects the said batteries in sequential manner to the output conductors 41, 42 by engagement with the short commutator segments 51, 52, 53, and 54. When the commutator brushes are in positions shown, a circuit path will be formed through positive battery 45, segment 51, brush 48, ring 44, and conductor 42. When brushes 47 and 48 shall have moved through an angle of 45°, brush 48 will disengage from the segment 51 and will rest upon an isolated segment while brush 47 will engage segment 51 to form a circuit path through positive battery 45, segment 51, brush 47, ring 43, and conductor 41. When the brushes shall have moved 90° from the position shown, brush 48 will engage segment 52 forming a circuit path through negative battery 46, segment 52, brush 48, ring 44, and conductor 42. When the brushes shall have moved 135° from the position shown, brush 47 will engage segment 52 forming a circuit path through negative battery 46, segment 52, brush 47, ring 43, and conductor 41. This sequence of four electrical impulses will be repeated through segments 53 and 54 resulting in repeated cycles each comprising a positive impulse on conductor 42 followed by a positive impulse on conductor 41 followed by a negative impulse on conductor 42 followed by a negative impulse on a conductor 41, completing the cycle.

Lamp 35 glows when motor 31 is rotating at any speed. Shaft 49 carries a worm 61 engaging a gear 62 upon a snail 63 whose follower 64, pivoted at 65 upon a pivoted armature 66 of snail magnet 67, engages the snail when magnet 67 is energized and is driven by the snail to engage and close contact members 68, see also Fig. 5. In operation, motor 31 is started by armature 37 of relay 38 and rotates for a counted number of revolutions as determined by snail 63 before the operation of closing the contacts 68.

At substation 11, motor 12 comprises a permanently polarized two-pole rotor and a fixed field structure having four polar field faces with four windings connected serially in pairs. Mounted on the rotor shaft 71 is a centrifugal device 13 controlling a switch 14 which comprises contact members 72 to 76 inclusive, and having further a rotary cam 77 controlling a switch 15. A correcting circuit including grounded battery, resistor 78, winding of relay 22, contact of relay 24, line conductor 21, contact members 73, 74, cam switch 15 when closed, and two field windings of motor 12, will supply to motor 12 a current sufficient to turn the rotor into that angular position wherein cam 77 opens cam switch 15, thus interrupting the described circuit. Cam switch 15 determines the angular stopping position of the rotor, thereby effecting its purpose of opening the line 21 after removal of plug 1 from jack 8 so that key 18 may be used for signaling.

An operator key 81 is connected to include into the communicative circuit of the plugs 1 and 2 an operator's set comprising recorder 82 and transmitter 83. During a connection between two lines, slow-to-release relays 84 and 85 hold their armatures attracted in response to signaling currents of communicative nature through the plugs 1 and 2. Induction coils having primary windings connected to a common alternating current source 10 have also secondary windings 88, 89, which supply alternating current to the circuits of the lines connected to plugs 1 and 2 for the purpose of synchronizing and driving substation motors 12 over circuits to be described.

Operation of the structure illustrated in Fig. 1 is as follows: An operator at substation 11 desiring to transmit a message to a substation on line 94 connected to line jack 95 will operate the calling key 18 to close a calling circuit including grounded battery, resistor 78, winding of relay 22, contacts of relay 24, line conductor 21, key 18, and ground, thus energizing relay 22 to illuminate lamp 23 over an obvious circuit, and thereby producing a visible signal to attract attention of a central office operator serving this line.

The central office operator awaits termination of the lamp signal and then responds by inserting plug 1 into jack 8 which closes an obvious sleeve circuit of the jack including windings of relays 39 and 24. Relay 24 energizes to prevent reenergization of relay 22 and to clear conductor 21 for transmission purposes. Relay 39 energizes, and by its armature contacts energizes relay 38 over an obvious circuit. Relay 38 attracts its armatures and armature 104 energizes snail magnet 67 over an obvious circuit while armature 37 closes an alternating current power circuit for motor 31 which begins to rotate and continues rotation with increasing speed.

Soon after beginning of rotation, centrifugal switch 34 closes an energizing circuit for lamp 35. Generator 7 now supplies a varying polyphase current comprising alternating potentials of increasing frequencies to the output conductors 41, 42, which now supply current to motor 12 over two paths as follows: With brushes 47, 48 in position shown, a circuit path extends from positive battery 45, through segment 51, brush 48, ring 44, output conductor 42, armature 108 of relay 5, ring members of plug 1 and jack 8, line conductor 21, and switch contacts 73, 74 to the open cam contact 15. Brushes 47 and 48 may start from any angular position of shaft 49. When brushes 47 and 48 reach a position 45° clockwise from the position shown, a circuit is formed from positive battery 45, through segment 51, brush 47, ring 43, output conductor 41, back contact and armature 105 of relay 5, line winding 106 of relay 38, tip members of plug 1 and jack 8, line conductor 107, contact members 75, 76, and two field windings of motor 12 to ground, energizing motor 12 to turn its rotor through 90°, thus closing cam switch 15. This is followed by current over a circuit including negative battery 46, segment 52, brush 48, ring 44, output conductor 42, back contact and armature 108 of relay 5, ring members of plug 1 and jack 8, line conductor 21, contact members 73, 74, closed cam contacts 15, and two field windings of motor 12 to ground, energizing motor 12 to turn its rotor a further 90°. Further rotation of the brushes of commutator 9 form a circuit from negative battery 46, segment 52, brush 47, ring 43, output conductor 41, back contact and armature 105 of relay 5, line winding 106 of relay 38, tip members of plug 1 and jack 8, line conductor 107, contact members 75, 76 and two field windings of motor 12 to ground, energizing motor 12 to turn its rotor through an additional 90°. This is followed by current over a circuit including positive battery 45, segment 53, brush 48, ring 44, output conductor 42, armature 108 of relay 5, ring members of plug 1 and jack 8, line conductor 21, contact members 73, 74, closed cam switch 15, since cam 17 now is 90° from its operating angle, and two field windings of motor 12 to ground, producing a field magnetization in motor 12 which will advance the rotor a further 90° completing one revolution of the motor 12. In the second half of the revolution of commutator 9, segments 53 and 54 cooperate with brushes 47 and 48 to repeat impulses of reversing polarity over conductors 41 and 42 and line conductors 107 and 21 to repeat the cycle of the rotor of motor 12 and this cycle of polyphase motor starting current is repeated with increasing frequency until the frequency of currents upon conductors 41, 42 equals or exceeds the frequency of currents obtainable from source of alternating current power 10, and the speed of rotation of motor 12 equals or exceeds the speed obtainable from the alternating current power source 10.

Should the brushes of generator 7 start from any position other than the position shown, the described starting of motor 12 will be delayed by a fraction of a cycle only.

As the speed of the rotor of motor 12 approaches the speed of the alternating current power source 10, the centrifugal device 13 will operate its switch 14 to reverse the contactual relations of contact members 72 to 76 and will remove cam 77 from engagement with switch 15 as illustrated in dotted line in Fig. 4. By reversal of contact members 72 to 76, an alternating current power circuit for continuous running of motor 12 is set up including batteries 45 and 46 in alternation, segments 51, 52, 53 and 54 in rotation, brush 47, ring 43, output conductor 41, back contact and armature 105 of relay 5, line winding 106 of relay 38, tip of plug 1, short spring of jack 8, line conductor 107, condenser 19, and two field windings of motor 12 to ground. Remaining windings of motor 12 are not used after starting, their circuit path being open at contact 74.

At the same time, by the operation of centrifugal switch 14, a telegraphic signaling path is formed including batteries 45 and 46 in alternation, segments 51, 52, 53, and 54 in rotation, brush 48, ring 44, output conductor 42, back contact and armature 108 of relay 5, ring of plug 1, long spring of jack 8, line conductor 21, switch contacts 73, 72, telegraph receiver magnets 16 and telegraph transmitter 17 to ground. The telegraph receiver 16 may operate irregularly.

Soon thereafter, snail follower 64 engages and closes snail contact members 68, thus completing a circuit for energization of snail relay 111 including grounded battery and resistor 112, winding of relay 111, armature 113 of energized relay 38, and contact members 68 to ground. Relay 111 operates its armatures and energizes relay 5 over a circuit including battery and resistor 114, armature 115 and contact of relay 111, winding of relay 5, and back contact and armature of unenergized relay 84 to ground. Relay 5 operates its armature 122 to interrupt the energizing circuit of relay 38 while its armature 108 forms an energizing circuit for slow-to-operate relay 84, the relay 38 releasing quickly to close an alternative ground connection through armature 123 for the described circuit of the winding of relay 5 before the slow-to-operate relay 84 has operated its armature to interrupt the original energizing ground contact just described for relay 5. Also, by its armature 124, deenergized relay 38 forms a holding circuit for relay 111 including grounded battery, resistor 112, winding and contacts of energized relay 111, armature 124 and ground. Also, by release of its armature 104, relay 38 interrupts the energizing circuit of snail magnet 67 causing release of pivoted armature 66 which withdraws snail follower 64 from snail 63 whereupon the follower is restored by its spring and permits contact members 68 to separate. Also, by release of its armature 37, relay 38 interrupts the power circuit of motor 31, the motor stops and lamp 35 is extinguished, thus placing generator 7 in condition to operate again in response to insertion of plug 2 into jack 95.

By energization of relay 5, a definitive alternating current power circuit has been formed for motor 12 including grounded battery 131, induction coil winding 88, front contact and armature 105, line winding 106 of relay 38, tip members of plug 1 and jack 8, line conductor 107, condenser 19, and two windings of motor 12 to ground. No direct current flows because of condenser 19 hence relay 38 is not energized. A definitive telegraphic communication circuit also has been formed by the operation of relay 5 including grounded battery, resistor 132, winding of repeating relay 133, contact and armature of energized repeating relay 134, contacts of operator key 81, winding of relay 84, front contact and armature 108, ring members of plug 1 and jack 8, line conductor 21, contact members 73, 72, selector magnets 16 of a recording receiver and contacts of permutation transmitter 17 to ground. In this circuit, a central office operator may include magnets 82 of a recording receiver and contacts 83 of a permutation transmitter by means of key 81.

In the circuits of repeating relay set 3, preliminary energizing conditions for the repeating relays 133 adn 134 have been provided by two preliminary circuits, one circuit including grounded battery, resistor 132, winding of relay 133, contact and armature of energized relay 134, contacts of manual switch 81, resistor 135, and armature 136 of unenergized relay 5 to ground, and the companion circuit including grounded battery, resistor 137, winding of relay 134, contact and armature of energized relay 133, resistor 138, and armature 139 of unenergized relay 6 to ground. In the circuits of the repeating relay set 3 as now established, energization of relay 5 interrupts the described preliminary energizing circuit of relay 133 and substitutes the definitive telegraphic communication circuit described above.

The central office operator, having operated key 81, having communicated with calling substation 11, and having ascertained that the operator at substation 11 desires to be connected to line 94, now establishes the connection by inserting plug 2 in line jack 95, which results in energizing relays 141 and 142 over the sleeve circuit of jack 95. Operation of the armature of relay 142 corresponding to relay 39 of plug 1 energizes relay 143 corresponding to relay 38 of plug 1.

Relay 143 by armature 144 energizes motor 31, and by armature 145 energizes snail magnet 67 so that generator 7 again starts and delivers current from its output conductors 41, 42 through back contacts and armatures 146, 147, of relay 6 and winding 148 of relay 143 to plug 2 and to the line conductors 94 and 159 and substation 151 associated with jack 95. In response to this starting current of varied frequency, the motor at the substation 151 is started and operates its centrifugal device corresponding to 13 of substation 11. Snail follower 64 closes snail contacts 68, thus completing a circuit through armature 152 of relay 143 to energize snail relay 153 whose armature 154 responsively closes a circuit through grounded battery, resistor 155, armature 154 of relay 153, winding of relay 6, and armature of relay 85 to ground to energize relay 6, which by armature 139 opens the described preliminary energizing circuit of repeating relay 134, by armature 157 interrupts the energizing circuit of relay 143, and by back contacts and armatures 146, 147 interrupts the circuits of output conductors 41, 42 of generator 7, while by front contact and armature 146, it forms a definitive alternating current power circuit including grounded battery 158, induction coil secondary winding 89, front contact and armature 146 of relay 6, winding 148 of relay 143, tip of plug 2, short spring of jack 95, line conductor 159 to substation 151, and through condenser and motor to ground as in substation 11, and by front contact and armature 147, the relay 6 forms a definitive telegraph communication circuit including grounded battery, resistor 137, winding of repeating relay 134, contacts of energized repeating relay 133, winding of slow-to-operate relay 85, front contact and armature 147, ring of plug 2, long spring of jack 95, line conductor 94 to substation 151 and through receiving and recording apparatus to ground as in substation 11.

Armature 157 deenergizes relay 143, armature 146 supplies alternating current but does not energize relay 143 to hold its armatures. Accordingly, relay 143 releases its armatures. Armature 156 provides ground for the winding of relay 6 before slow-to-operate relay 85 opens its ground connection, armature 161 forms a holding circuit for relay 153, while armatures 144, 145, open their circuits to deenergize motor 31 and snail magnet 67, thus stopping the motor 31, extinguishing lamp 35 and restoring arm 64.

The two substations, both illustrated by details shown in substation 11, are now in communication over the circuits described by means of repeating relay set 3, and the motors thereof are maintained at exact speed by currents derived from alternating source 10 and distributed to the substations over the described alternating current power circuits.

Relays 84 and 134 now are energized by communication signaling currents of marking nature flowing to substation 11 through jack 8, while relays 85 and 133 are energized by similar currents through jack 95. Relays 24, 39, 141, and 142 are held energized by sleeve circuits of plugs 1 and 2. Relays 5 and 6 are held energized by individual holding circuits under control of contacts in unenergized relays 38 and 143 respectively.

Means is provided for restarting automatically a stopped substation motor during communicative condition. Should either substation motor or both of them for any cause as by a line fault become out of phase with its power source 10 or for any other reason come to rest, or if the motor should slow down to a speed below that necessary to keep the centrifugal device 13 operated, contacts 75, 76 will shunt the condenser 19. This will permit direct current from battery 131 to flow through the power circuit described, resulting in energization of relay 38 to attract its armatures which will set up the starting conditions of generator 7 with release of relay 5, so that output conductors 41, 42 again will deliver to motor 12 polyphase currents of increasing frequency to bring the motor again into phasing speed with the source 10 when the centrifugal device 13 and the snail contact 68 again will function to energize relay 5 or 6 and deenergize relay 38 or 143, thus restarting the substation motor and reestablishing the communicative condition.

There are provided a plurality of complete equipments of generator 7 and motor 31, one for each connective pair of plugs, one such pair being illustrated by plugs 1, 2.

Figures 2, 3:
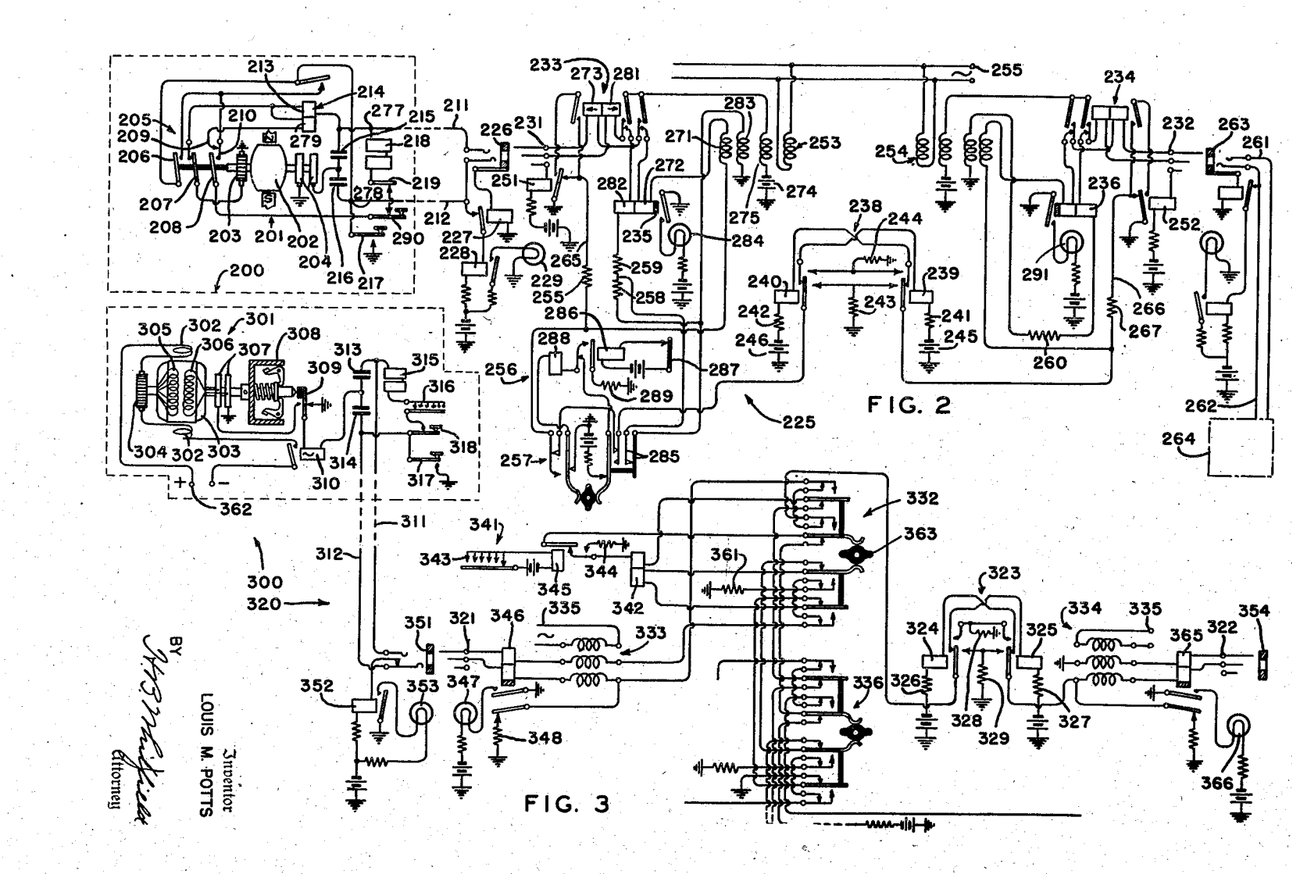
Fig. 2 illustrates a modification embodying a self-starting substation motor with automatic starting switches and circuits.
Fig. 3 illustrates a central office connective unit and a substation having a synchronous motor with an auxiliary source of power.

Referring to Fig. 2, the system therein illustrated utilizes for driving the telegraph apparatus at the substation a motor in which there is provided a permanent field and a distributed winding with a segmented commutator, and in which there also are provided collecting rings connected to a further synchronous winding as illustrated in Fig. 3. Direct current for starting the motor is transmitted over the two sides of the line in parallel and subsequently alternating current is transmitted over the two sides of the line in parallel for driving and synchronizing, while telegraphic signaling current is transmitted over the two conductors of the line looped in series.

At the substations 260 and 264, the motor 201 comprises a permanent magnetic field and a rotor 202 having a distributed winding connected to a segmented commutator 203. Collecting rings 204 are connected to a further winding in the rotor. A centrifugal switch 205 operates when the motor is substantially at synchronous speed with source 255 and contains switching elements 206 to 210 which control substation circuits for line conductors 211 and 212. In the illustrated normal position of the centrifugal switch, assumed when the motor is inert, line conductor 211 is connected through winding 213 of relay 214, switching element 207 and commutator 203 to ground. Line conductor 212 is open to direct currents.

Line conductors 211 and 212 are connected through condensers 215 and 216 to brushes of collecting rings 204. A manual key 217 serves to control signal devices at a central office or switching station to attract attention of an operator. Selector magnets 218 symbolize a complete recording receiver, and contacts 219 symbolize a complete code signal transmitter. Circuits for the described apparatus parts will be disclosed in a description of operation of the structure illustrated in Fig. 2.

At a central station 225, equipment for the line 211, 212 comprises a jack 226, a cut-off relay 227, a calling line relay 228, and a calling line lamp 229. A pair of connective plugs 231, 232 are associated together for communication through double wound relays 233, 234, slow-to-release relays 235, 236, and a repeating relay set 238, comprising repeating relays 239, 240, resistors 241, 242, 243, 244, and grounded batteries 245, 246.

Sleeve relays 251 and 252 are included in sleeve circuits of plugs 231 and 232 respectively. Armature members of relays 233 and 234 are associated through repeating coils 253 and 254, respectively, with an alternating current power source 255 having a frequency higher than baud value of permutation code transmission and windings of the same induction coils are included in power circuits and telegraphic communication circuits to be described. An operator's telegraph set 256 may be switched into circuits of the plug pair 231, 232 by means of manual key 257. Resistor 258 balances against the operator's set 256, resistor 259 balances against repeating relay 239, and resistor 260 balances against repeating relay 240. A second substation line 261, 262 is indicated in association with jack 263 and substation 264 to duplicate the substation 200. Preparatory energizations of repeating relays 239 and 240 are effected for relay 240 by current over a circuit 265 including grounded battery 245, resistor 241, winding of repeating relay 239, contact and armature of energized repeating relay 240, contacts of manual key 257, resistor 255, circuit conductor 265, back contact and armature of sleeve relay 251, and ground, and for relay 239 over a companion circuit 266 including grounded battery 246, resistor 242, winding of repeating relay 240, contact and armature of energized repeating relay 239, resistor 267, circuit conductor 266, back contact and armature of relay 252, and ground.

Operation of the structure of Fig. 2 is as follows: An operator at substation 200 closes the manual key 217 thereby energizing signal lamp relay 228 over a calling circuit including grounded battery, resistor, winding of line relay 228, contacts of cut-off relay 227, line conductor 212, key 217 and ground. Contacts of energized relay 228 cause illumination of lamp 229 over an obvious circuit.

An operator at the central office 225 awaits cessation of the illumination of lamp 229, then inserts plug 231 into jack 226, energizing sleeve relay 251 and cut-off relay 227 over an obvious circuit. Energization of sleeve relay 251 opens circuit 265 and thereby interrupts the described preparatory energization of repeating relay 239 whose deenergization changes the energizing circuit of repeating relay 240 from the described preparatory circuit 266 to a holding circuit including ground, resistor, winding of repeating relay 240, make-before-break contacts of deenergized repeating relay 239, resistor 244, and ground.

Insertion of plug 231 also results in energization of relays 214, 233, 235, and reenergization of relay 239 over a line circuit of first response including grounded battery, resistor 241, winding of repeating relay 239, contact and armature of energized repeating relay 240, contacts of manual key 257, induction coil winding 271, winding 272 of relay 235, make-before-break contacts of relay 233, winding 273 of relay 233, tip of plug 231, short spring of jack 226, line conductor 211, winding 213 of relay 214, contact and switch member 207, commutator 203, and ground. Operation of relays 214 and 233 interrupt the described line circuit of first response and substitute two parallel motor starting circuits each carrying direct current from battery 274 as a souce of motor starting current and carrying also alternating current from induction coil winding 275 as a source of motor synchronizing current. The parallel motor starting circuits extend for both classes of current from ground, through battery 274, induction coil winding 275, both of the make-before-break armatures and long contact members of operated relay 233, both windings of relay 233, tip and ring of plug 231, both springs of jack 226, and both line conductors 211 and 212 to junctions 277, 278 respectively at substation 200, extending thence for alternating currents through condensers 215, 216, collecting rings 204 and ground, and extending for direct currents from junction 277, through an energizing winding 213 of relay 214, contact and switch member 207 and commutator 203 to ground, also from junction 278, through contacts of energized relay 214, switch contacts 210, 209, winding 279 of relay 214, contact and switch member 207 and commutator 203 to ground. Direct currents start the rotor 202 and drive it with increasing speed until synchronism with source 255, through induction coil winding 275, is approximated whereupon torque derived from alternating currents through rings 204 will supplement torque derived from direct current through commutator 203, the rotor will attain synchronism, and centrifugal switch 205 will due to its predetermined speed adjustment, be operated.

Operation of centrifugal switch 205 removes all conductive ground for direct current from line conductors 211, 212 at substation 200, whereupon direct current ceases in windings of relays 214 and 233 and those relays are deenergized, resulting in establishment of a first communication circuit and of definitive parallel alternating current power circuits. The first communication circuit includes grounded battery 245, resistor 241, winding of repeating relay 239, contact and armature member of repeating relay 240, contacts of manual key 257, induction coil winding 271, winding 272 of relay 235, make-before-break contacts and winding 273 of relay 233, tip of plug 231, short spring of jack 226, line conductor 211, junction 277, windings of selector magnet 218, contacts of code transmitter 219, break key 290, centrifugal switch member 208 and its long contact spring 210, contact and switch member 206, junction 278, line conductor 212, long spring of jack 226, ring of plug 231, winding 281 and make-before-break contacts of relay 233, winding 282 of relay 235, resistor 259 (to balance winding of relay 239), closed contacts 285 of manual key 257, induction coil winding 283, and ground. Differential relay 233 is not energized. Relay 235 is energized and closes an obvious circuit to illuminate lamp 284 to indicate to an operator at set 256 that the described circuit has been completed. The definitive synchronizing power circuits extend from ground, through induction coil winding 283, closed contacts 285 and resistor 259, to winding 282 of relay 235, and from grounded battery 245, through resistor 241, winding of repeating relay 239, contact and armature of energized repeating relay 240, contacts of manual key 257, and induction coil winding 271 to winding 272 of relay 235, thence through windings of relay 235, through make-before-break contacts of deenergized relay 233, windings of relay 233, tip and ring elements of plug 231 and jack 226, line conductors 211 and 212, condensers 215 and 216, then uniting and continuing through collecting rings 204 to ground. Relay 233 is magnetized to an insufficient degree by the transmitted alternating power current, and its armature members are not operated.

The paths for alternating current constitute a phantom channel upon the line 211—212 which is operatively independent of transmission of telegraphic signals over the described telegraph communication circuit, in which signals are originated at substation 200 by substation transmitter 219, and at central station 225 by contacts of repeating relay 240 or by contacts of transmitting relay 286 responsive to transmitter 287 in operator's set 251. When contacts of repeating relay 240 are operated, resistor 243 is substituted for winding of relay 239, resistor 241 and battery 245 in one side of the phantom circuit, maintaining both its conductive continuity and its resistance value but eliminating battery to produce a spacing telegraphic signal while maintaining the power circuit effectively unchanged. Resistor 259 is included in series in one side of the phantom circuit of plug 231 to balance resistor 241 and winding of relay 239 in the other side of the phantom circuit of plug 231, while resistor 260 is included in series in one side of the phantom circuit of plug 232 to balance resistor 242 and winding of relay 240 in the other side of the phantom circuit of plug 232. When manual key 257 is operated to include operator's set 256 and its selector magnet 288 in the telegraph communication circuit and, therefore, in one side of the phantom circuit of plug 231, its contacts 285 open a shunt thereby to include a balancing resistor 258 in the other side of the phantom circuit of plug 231 to maintain balance between the two sides and then when transmitting relay 286 is operated with key 257 in reversed condition, a resistor 289 to ground is substituted for winding of relay 239, resistor 241, and battery 245 to ground.

Having inserted plug 231 into jack 226 in manual response to illumination of signal lamp 229, a switching operator awaits illumination of signal lamp 284 which will not become energized until after the connected substation motor 201 has attained its synchronous speed with resultant de-energization of relay 233 and energization of relay 235. Key 257 then may be operated, thus connecting set 256 and substation 200 for communication, and the switching operator may complete a communicative connection between two substations by inserting plug 232 into any substation jack 263. After a cycle of operation to start the motor at substation 264, relay 236 will be energized and lamp 291 will be illuminated, the two lamps 284 and 291 then functioning to advise the switching operator that the two substations 200 and 264 are connected and conditioned for communication. Either station may operate a break key 290 to control relay 235 or 236 to flash lamp 284 or 291 intermittently to attract attention of the operator.

Referring to Fig. 3, a structure is disclosed in which local substation power either direct current or alternating current is supplied to energize the substation motor and in which the local power is supplemented by alternating current from a central power supply which is transmitted over the phantom circuit of the line for synchronization only. Local power at the substation is applied under control of the transmitted central power through a relay responsive to alternating currents received over the phantom from the central office.

At substation 300, a driving motor 301 comprises field 302, rotor 303, commutator 304, and distributed winding 305 for driving the motor by direct or alternating current, also a further rotor winding 306 and collecting rings 307 for driving the motor by alternating current. The motor is provided also with a centrifugal switch member 308 and electrical switch 309 which is operated when the motor reaches its synchronous speed and remains operated throughout the ensuing communication. A motor control relay 310 has its contact and armature connected in the local power circuit of the motor and when energized, closes the circuit of the local current winding of the rotor. Line conductors 311 and 312 are connected through condensers 313 and 314 to winding of relay 310 and through centrifugal switch 309 and its contact to ground. Selector magnets 315 representing a recording receiver and contacts 316 representing a code signal transmitter are bridged permanently from conductor 311 to conductor 312. A manual calling key 317 is connected between conductor 312 and ground. A break key 318 is provided.

At the central office 320, a pair of connective plugs 321 and 322 are connected together through a repeating relay set 323, comprising repeating relays 324 and 325 and resistors 326, 327, 328, and 329. Included also between plugs 321 and 322 are a manual key 332 and two induction coils 333 and 334 whose primary windings are associated with a source of alternating current 35, appearing at several points in the drawing and bearing the same reference numeral at all occurrences.

Keys 332, 336 are associated by circuits with an operator's set 341 comprising a double-wound selector magnet 342, a code transmitter 343, a resistor 344, transmitting relay 345 having make-before-break contacts. Plug 321 also is provided with a double-wound relay 346, a signal lamp 347, and a resistor 348. It is intended that the plug 322 be similarly equipped.

Line 311—312 has central office equipment comprising a jack 351, a calling relay 352, and a calling lamp 353. Jack 354 represents another complete line structure similar to jack 351 and line 311—312. Preparatory circuits for energization of repeating relays 324 and 325 include grounded battery, resistor 327, winding of repeating relay 325, contacts of repeating relay 324, contacts of key 332, contacts of relay 346 and resistor 348 to ground, also battery, resistor 326, winding of relay 324, contacts of relay 325, contact of double-wound relay 365, and resistor to ground.

In operation, closure of key 317 energizes calling relay 352 and calling lamp 353 over obvious circuits. An operator at the central office responds by inserting plug 321 into jack 351, thereby forming circuits for both direct current and alternating currents. For direct current, the circuit includes grounded battery, resistor 327, winding of repeating relay 325, contacts of energized repeating relay 324, contacts of key 332, a lowest winding of induction coil 333, lower winding of relay 346, ring of plug 321, long spring of jack 351, line conductor 312, break key 318, normally closed contacts of permutation transmitter 316, recorder magnets 315, line conductor 311, short spring of jack 351, tip of plug 321, upper winding of relay 346, middle winding of induction coil 333, contacts of key 332, and resistor 361 to ground, energizing relay 346 which closes an obvious circuit to illuminate lamp 347.

For alternating currents, a circuit includes grounded battery, resistor 327, winding of relay 325, contacts of relay 324, contacts of key 332, lowest winding of induction coil 333 as a source of alternating current, lower winding of relay 346, ring of plug 321, long spring of jack 351, line conductor 312, condenser 314, alternating current relay 310, and switch 309 to ground, also a companion circuit includes ground, resistor 361, contacts of key 332, middle winding of induction coil 333 as a source of alternating current, upper winding of relay 346, tip of plug 321, short spring of jack 351, line conductor 311, condenser 313, alternating current relay 310, and switch 309 to ground, thus energizing relay 310 whose contacts connect commutator 304 and rotor winding 305 to a source of current 362. The rotor 303 starts under energy received from source 362 and when operating speed is reached, the centrifugal switch 309 operates to include the rings 307 and winding 306 in the circuits for alternating currents traced above. Alternating currents over a phantom circuit including conductors 311, 312, and earth now synchronize the rotor 303, and communication may be effected. The phantom circuit is balanced at substation 300 by matched condensers 313 and 314, and at central office 320 by two windings of relay 346, by two secondary windings of induction coil 333 and by resistor 361 balanced against resistor 327 and winding of repeating relay 325.

An operator at central office 320 now may operate key 332 by rotating a cam 363 through an angle at 90°, thereby connecting receiver magnet 342 into the described line and phantom circuits in balanced manner and including also contacts of transmitting relay 345. Thereafter, communication may proceed between operator's set 341 and substation 300. Opening the conntacts of transmitter 316 to produce a spacing signal does not unbalance the phantom circuit, and opening the contacts of transmitter 343, to produce a spacing signal, operates relay 345 to substitute resistor 344 in place of resistor 327 and winding of relay 325 thereby maintaining the phantom circuit in balance.

A connection for intercommunication between two substations is completed by inserting plug 322 into jack 354, energizing relay 365 and illuminating lamp 366. At either connected substation, the substation operator may attract attention of the central office operator by opening a break key 318, deenergizing one of the doublewound relays 345 and 365 to extinguish one of the signal lamps 347 or 366. Responsively to operation of a key 318, a lamp may be flashed repeatedly until a central office operator answers.

Other applications of the invention as defined by the appended claims may be made in full or in part as required to practice the invention to any desired extent.

What is claimed is:

1. In a telegraph switching system, a switching station, remote telegraph stations, lines connecting said remote stations to said switching station, apparatus at said switching station to seize lines for interconnecting said remote stations for intercommunication, telegraph sets and driving motors therefor at said remote stations, and means for completing over a line to a selected remote station both a communication circuit for the telegraph set at said selected station and a motor operating circuit including the windings of the motor at said selected station by the act of seizing the line for communication.

2. In a telegraph switching system, a switching station, remote telegraph stations, lines connecting said remote stations to said switching station, apparatus at said switching station to seize a line for interconnecting said remote stations, telegraph sets and driving motors therefor at said remote stations, and means for completing over a line to a selected station both a communication circuit for the telegraph set at the selected station and a motor synchronizing circuit including the windings of the motor at the selected station by the act of seizing a line for communication.

3. In a telegraph system, a central station, remote telegraph stations, lines connecting said central station to said remote stations, telegraph sets and associated driving motors at said remote stations, a source of power at said central station, and means at said central station for connecting said source of power over a selected line to drive the motor at the selected station and for completing a telegraph circuit over the selected line for the telegraph set at the selected station.

4. In a telegraph system, substations, telegraph sets at said substations including synchronous motors, a central office including lineswitching apparatus to interconnect said substations, a source of variable frequency alternating current, communication lines connecting said substation sets to said line-switching apparatus, and means at said central office to apply over a seized line and through a motor at a selected station a series of alternating impulses of increasing frequency for starting said motor in response to seizure of the line for communication.

5. In a telegraph system, a telegraph set, a driving motor for said set, a line comprising two conductors, means including circuits through both of said two conductors and through windings of said motor for starting said motor, means including a circuit through one of said two conductors and through a circuit of said motor for driving said motor, and means including a circuit through the other of said two conductors for operating said telegraph set for communication.

6. In a telegraph system, a telegraph set, a driving motor for said set, a loop circuit for communication with said set, an alternating current source of power of frequency higher than the baud value of said communication circuit and a power circuit including conductors of said loop circuit for alternating power currents for driving said motor.

7. In a telegraph switching system, a switching station, remote telegraph stations, lines radiating from said switching station to said remote stations, switching apparatus at said switching station to seize the lines for interconnecting said remote stations, telegraph sets and driving motors therefor at said remote stations, a normally inert motor generator at said central office, and means responsive to seizure of a line for communication for starting said generator and for connecting said generator to the seized line for applying starting current to a motor at a remote station over said line while said starting motor generator is increasing in speed.

8. In a telegraph system, a telegraph substation set having a driving motor, a direct current source of power for signaling, a communication line connected to said substation set for direct current signaling, an alternating current source of power for driving said motor, means for transmitting alternating currents through said motor over said communication line, a synchronizing winding in said motor, and means responsive to motor speed to synchronize said motor by said alternating currents.

9. In a telegraph system, a telegraph substation set having a driving motor, a direct current source of power, a communication line to said substation set, means including said communication line and said source of power for direct current telegraph signaling, an alternating current source of power, a circuit superposed on said communication line, means for transmitting alternating currents through said motor over said superposed circuit, and a motor control relay at said substation responsive to said alternating currents.

10. In a communication system, a central station, a substation, a telegraph set at said substation including a driving motor, a two conductor communication line connecting said substation to said central station, a source of power at said central station, starting circuits for said motor including said source of power and the conductors of said communication line in parallel, means at the central station to seize said line, and means responsive to the seizure of said line for communication to connect said starting circuits to said motor.

11. In a communication system, two stations, a pair of wires connecting said stations, a motor and motor driven communication apparatus at each station, a power supply at one station, means to transmit power over the two wires in parallel to operate the motor at the other station, and means to establish communication between the two said apparatus over the two wires in series.

12. In a telegraph system, two stations, a pair of wires connecting said stations, motor driven telegraph apparatus at each station, a source of power at one station having motor speed controlling characteristics, means to control the speed of the motor at the other station by impulses transmitter from said source of power through said motor over the two wires in parallel, and means to control variably one telegraph apparatus from the other by impulses transmitted over the two wires in series.

13. In a telegraph system, a central station, a remote station, a telegraph set including a driving motor at said remote station, a line to connect said remote station to said central station for intercommunication, means at said central station to seize said line to establish a motor control circuit and a telegraph circuit for said remote station, a calling key at said remote station, a calling signal device at said central station, a calling circuit including said key and said signal device and responsive to the operation of said key when said line and seizing means are disengaged, and a switch controlled by said motor to render said signaling circuit unresponsive to the operation of said key while said motor is in operation and said line is not seized.

14. In a telegraph system, a central station, a remote station, a telegraph set including a driving motor at said remote station, a line to connect said remote station to said central station for intercommunication, means at said central station to seize said line and complete both a motor control circuit and a telegraph circuit for the set at said remote station, a switch operated by said motor, and a further circuit including said switch conditioned upon the disengagement of said seizing means to cause the motor to come to rest in a predetermined condition.

15. In a telegraph system, a central switching station, a plurality of substations having motors, lines connecting said central station with said substations, switching means at said central station for interconnecting said lines and substations, cyclically operating means normally inert for starting a motor at a substation, means responsive to the act of connecting a calling line to said switching means for rendering said cyclically operating means active to start a motor by current over a line and through a motor at the said connected calling substation, automatic means for restoring said cyclically operating means to inert condition after the motor at the calling station has been started, and further automatic means rendering said cyclically operating means again active to start a motor at a substation selected and connected with for interconnection with said calling substation.

16. In a telegraph system, a telegraph substation set having a driving motor, a driving winding in said motor, a synchronizing winding in said motor, a source of power at said substation to drive said motor, a communication line connected to said substation set for direct current telegraph signaling, a motor control relay, an alternating current source of power, means for transmitting alternating currents over said communication line and through said motor control relay to connect said source of power at said substation to said driving winding, and means responsive to motor speed to switch alternating currents over said communication line through said synchronizing winding to synchronize said motor.

17. In a telegraph system, a central station, a remote station, a communication line to connect said remote station to said central station, telegraph apparatus at said remote station including a driving motor, a source of power at said remote station to drive said motor, a circuit connecting said source of power to said motor, a relay to condition said circuit, a source of alternating current at said central station, means at said central station to seize a line, and means operable upon the act of seizing a line to complete a telegraph circuit for said apparatus and to supply alternating current over said circuit to said remote station to energize said relay and start said motor.

18. In a telegraph system, a substation, a motor and motor driven apparatus at the substation, a central station, electrical connections between the central station and the substation, a direct current source of power, an alternating current source of power, means including said electrical connections to apply direct current to start the motor at the substation, means to transmit subsequently over said electrical connections and through said motor alternating current to control the synchronous operation of the motor, and means to establish a communication circuit simultaneously with the beginning of transmission of the alternating current.

19. In a telegraph system, telegraph apparatus, a motor to drive the telegraph apparatus, a telegraph line for the apparatus, a starting circuit for said motor including said line and a winding of said motor, a running crcuit for said motor, a telegraph circuit for said apparatus including said line, a centrifugal device driven by said motor, and means controlled by said centrifugal device to disconnect the starting circuit from the motor and to connect said running circuit to said motor and said telegraph circuit to said apparatus.

20. In a telegraph system, two stations, telegraph receivers and driving motors therefor at said stations, a telegraph communication line connecting said two stations, means to transmit telegraph signals over said line, a power source of alternating current at one of said stations, and circuit means for transmission of alternating current from said power source over said telegraph communication line to the motor of the other of said stations independently of said communication signals.

21. In a telegraph system, a central station, remote telegraph stations, telegraph sets and driving motors therefor at said remote stations, lines connecting said remote stations to said central station, apparatus at said central station to seize said lines, an alternating current power supply at said central station, and means responsive to the seizure of a line to complete a telegraph circuit over said line to a remote station and to connect said supply over said line to the motor at said remote station to start said motor.

22. In a telegraph switching system, a switching station, lines radiating from said station, switching apparatus at said station for seizing said lines for communication, telegraph sets and driving motors therefor on said lines, a source of alternating current at said switching station, and means embodied in said switching apparatus at said station for forming a communication circuit for a telegraph set over conductors of a seized line and for supplying synchronizing alternating current from said source over said conductors to the winding of the driving motor of said telegraph set on said seized line.

23. In a communication system, a telegraph set including a driving motor, a communication line connected to said set, a source of power, a first circuit to said set including said line for communication signaling, and a second circuit to said set superposed on said first circuit, said second circuit including said motor, said line, and said source of power to control said motor.

24. In a telegraph system, a telegraph loop, telegraph communication apparatus connected in said loop, a motor for driving said apparatus having a synchronous winding, a circuit for said synchronous winding including line conductors of said loop, an auxiliary starting winding in said motor, a circuit for said starting winding including a conductor in said loop, and a centrifugal device in said motor to switch said motor from starting winding to said synchronous winding.

25. In a telegraph system, a telegraph set, a driving motor for said set, a line including two conductors, means including said two conductors to supply starting current over said conductors and through said motor to start said motor, means to vary the frequency of said starting current through progressive stages of starting to bring said motor to a predetermined speed, means including one of said conductors for thereafter maintaining the speed of said motor, and means including the other of said conductors for operating said telegraph set for communication.

26. In a telegraph system, a central station, a plurality of substations having telegraph sets and driving motors, a plurality of two conductor telegraph lines connecting said central station and said substations, a polyphase generator at said central station, starting circuits each including a motor and the two conductors of one of said telegraph lines connecting said motors to said generator, and means for running said motors subsequently over but one of said conductors in each of said lines and for completing telegraph circuits over the other of said lines to said telegraph sets.

27. In a telegraph system, a central station, a remote station, a two conductor line connecting said remote station and said central station, a telegraph set at said remote station including a driving motor, a first source of power and a second source of power at said central station, a starting circuit for said motor including said first source of power and said two conductor line, a running circuit for said motor including said second source of power and one conductor of said line, a telegraph circuit for said set including the other conductor of said line, and means to disconnect said starting circuit and to connect said running circuit and said telegraph circuit to said telegraph set at said remote station after said motor has started.

28. In a telegraph system, a substation, motor driven telegraph apparatus at the substation, a central station, a direct current source of power, an alternating current source of power, telegraph loop connections between the central station and the substation including two conductors, means to transmit direct current through said motor and over both conductors in parallel of said telegraph loop connections to start the motor, and means to subsequently transmit over both conductors in parallel of said telegraph loop connections alternating current for synchronously operating said motor during operation of said telegraph loop for telegraphy by commutated direct current.

29. In a telegraph system, a substation, motor driven telegraph apparatus at the substation, a central station, a direct current source of power, an alternating current source of power, telegraph loop connections between the central station and the substation, means including first circuits superposed on said telegraph loop connections to apply direct current through the motor to start the motor at the substation, and means to transmit over second circuits superposed on said telegraph loop connections alternating current to control the synchronous operation of the motor.

30. In a telegraph system, a telegraph substation, a central station, telegraph connections over two wires between the substation and the central station, motor driven telegraph apparatus and a motor at the substation, means including electrical connections over said two wires in parallel and through the motor to start the motor, and automatic means effective after the motor has attained substantially synchronous speed to establish an alternating-current motor-driving-power circuit over a phantom circuit upon said two wires, and to establish a telegraph loop circuit upon said two wires for communication by commutated direct current.

31. In a telegraph system, a central office, two telegraph substations, two-conductor lines connecting said substations to said central office, driving motors, one at each of said substations, telegraph apparatus at said substations to be driven by said motors, a source of alternating current at said central office, means at said central office to seize said lines to connect said substations for intercommunication, means including circuits through a single conductor of each of said lines and through said motors for maintaining said motors in synchronism with each other including means for connecting said substations through said one conductor of said line circuits to said source of alternating current at said central office, further means including both conductors of said two-conductor lines for starting said motors one at a time in the order that their lines have been seized at said central office, and automatic means to connect a started motor through one conductor of a line to said first mentioned means, and to connect the other conductor to said telegraph apparatus.

32. In a communication system, a plurality of substations, motors at each substation, a central station, two-conductor lines connecting said substations to said central station, means at said central station to seize said lines for intercommunication, means including both conductors of one of said lines in series with a motor to start and bring to a predetermined speed one by one a plurality of said motors, in the sequence in which their lines have been seized, independent means including but one conductor of a line to maintain said motors at synchronous speeds, telegraphic apparatus at said substations driven by said motors, and means to connect said telegraphic apparatus to the other conductor of a line only when said independent means is in operated condition.

33. In a telegraph system, a central station, a remote station, a line comprising two conductors to connect said remote station and said central station, a telegraph set and driving motor therefor at said remote station, means at said central station to seize said line and establish over said line a motor operating circuit and a telegraph circuit for said set at said remote station, a call-signal circuit extending between said remote station and said central station, and means at said substation controlled by said motor to disconnect said telegraph set from said line and to prepare said call-signal circuit, said last named means being operable when said seizing means releases said line.

34. In a communication system, a switching equipment, a remote communication set, a motor having an armature for driving said set, a motor controlled cam, a cam switch controlled by said cam, a communication line connecting said switching equipment and said set, a call-signal circuit including a communication line conductor, and a power circuit including said communication line conductor, said motor, and said cam switch for propelling said armature into a predetermined angular position and for operating said cam switch to prepare said call-signal circuit, said power circuit being operable when said communication line is disconnected from said switching equipment.

35. In a telegraph system, a central station telegraph set, a plurality of substation telegraph sets having telegraph apparatus and driving motors, lines and switching means for connecting said central station telegraph set with one of said substation sets for intercommunication, cyclically operating means normally inert for starting a motor of a substation set over a circuit including one of said lines, means responsive to the act of connection with a substation set for rendering said cyclically operating means active to start a motor of a selected substation set, and automatic means for establishing a driving circuit including a line conductor for said started motor, for establishing intelligence communicative conditions for the selected telegraph apparatus thereof and for restoring said cyclically operating means to inert condition after starting a motor.

36. In a telegraph system, a central station, a remote station, a two conductor line to connect said remote station and said central station, a telegraph set at said remote station including a driving motor, a generator at said central station normally inert, means at the central station to seize the line, a starting circuit including said two conductor line and said generator, means responsive to the act of seizing a line to condition said starting circuit and to operate said generator to start said motor at said remote station, and means subsequently operable to establish a running circuit for said motor including one conductor of said line and to establish a telegraph circuit for said set at said remote station.

37. In a communication system, a substation, motor driven apparatus at the substation, a central station, electrical conductors between the central station and the substations, a source of direct current power, a source of alternating current power, means including said electrical conductors to apply direct current to said conductors to start the motor at the substation, and means to transmit thereafter concurrently over said electrical conductors commutated direct current for intelligence signaling and alternating current to control the synchronous operation of the motor.

38. In a communication system, a communication loop circuit, communication apparatus, a motor to drive the said apparatus, means to start the motor with direct current, a motor synchronizing circuit superposed on said communication loop circuit, and automatic means effective after the motor has obtained substantially full speed to establish the motor synchronizing circuit.

LOUIS M. POTTS.